United States Patent [19]
Lagomarsino

[11] 3,718,543
[45] Feb. 27, 1973

[54] BACTERIORIA TEST MATERIAL

[75] Inventor: John A. Lagomarsino, Wantagh, N.Y.

[73] Assignee: Bio-Derivatives Corporation, Deer Park, N.Y.

[22] Filed: Jan. 4, 1971

[21] Appl. No.: 103,695

[52] U.S. Cl. ............... 195/99, 195/103.5 R, 195/127
[51] Int. Cl. ............................................... C12k 1/10
[58] Field of Search .... 195/103.5 R, 100; 23/253 TP; 252/408

[56] References Cited

UNITED STATES PATENTS

| 3,415,717 | 12/1968 | Avakian | 195/100 |
| 3,547,780 | 12/1970 | Finnerty | 195/103.5 R |
| 3,232,710 | 2/1966 | Rieckmann et al. | 195/103.5 R |
| 3,634,198 | 1/1972 | Truhan | 195/103.5 R |

Primary Examiner—Lionel M. Shapiro
Assistant Examiner—Robert J. Warden
Attorney—Robert S. Dunham, P. E. Henninger, Lester W. Clark, Gerald W. Griffin, Thomas F. Moran, Howard J. Churchill, R. Bradlee Boal, Christopher C. Dunham, Robert Scobey and Henry T. Burke

[57] ABSTRACT

An improved bacteriuria test material is made up of an admixture of sulfanilamide and N-(1-Naphthyl) ethylene-diamine dihydrochloride. In one embodiment a solution of these materials is employed to impregnate a paper strip or a cotton swab and then permitted to dry. In use when the resulting test material, such as the aforementioned impregnnated paper or cotton swab, is brought into contact or wetted with a test specimen containing nitrite, indicating the presence of bacteria in the urine or the test specimen, the paper or swab undergoes a fairly rapid color change to a rose or red color.

20 Claims, 5 Drawing Figures

PATENTED FEB 27 1973
3,718,543
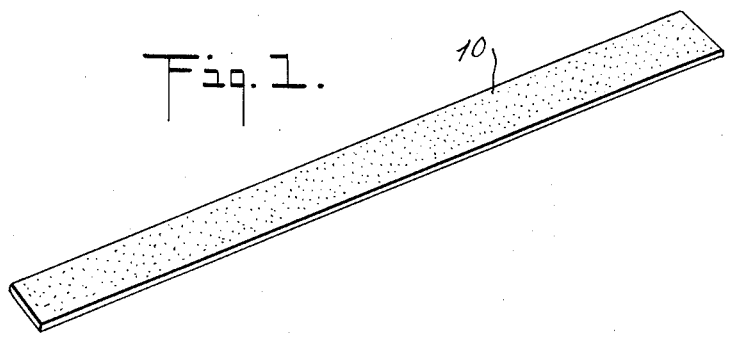
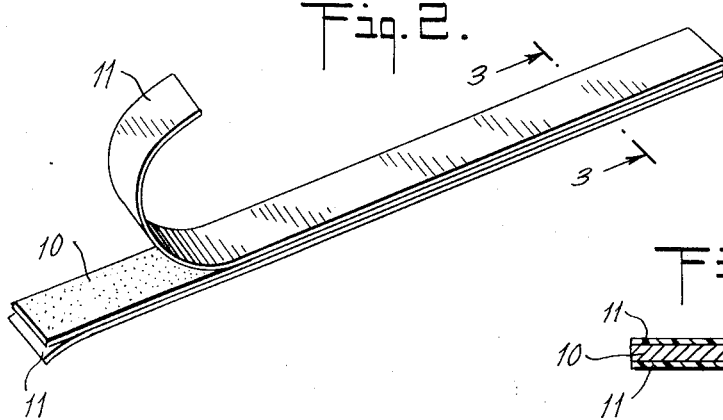
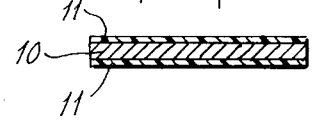
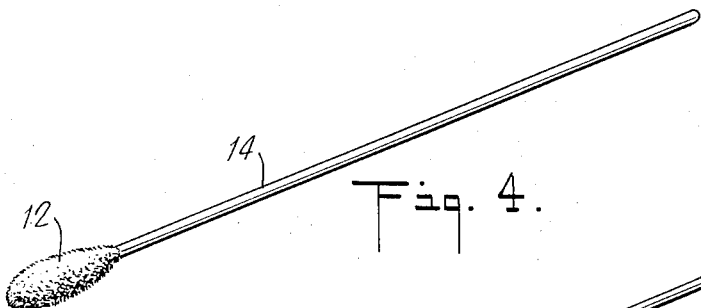
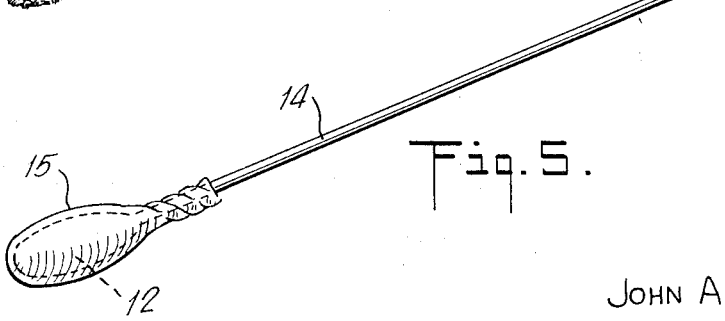
INVENTOR.
JOHN A. LAGOMARSINO
BY
Thomas F. Moran
ATTORNEY

BACTERIORIA TEST MATERIAL

This invention relates to test materials or reagents useful in determining bacteriuria. More particularly, Griess, see Ber. deutsch. chem. Gesellsch. 12, 426–428 (1879), shows that certain bacteria could be detected in water supplies due to the presence of nitrite by the production of a red color upon addition of an acidic sulfanilic acid-alpha-naphthylamine reagent. U.S. Pat. No. 3,415,717 discloses a bacteriuria test paper embodying the Griess test and made up of paper impregnated with a sulfonamide, an N,N-dialkyl-1-naphthylamine and an acyclic hydroxy polycarboxylic acid. Such test papers, however, must be stored in a light-proof, air-tight bottle preferably in the presence of a desiccant. Moreover, such test materials are made up of three components, a sulfonamide, an appropriate amine and an acid.

It is an object of this invention to provide improved reagent material useful in determining the presence of bacteriuria.

It is another object of this invention to provide an improved bacteriuria cotton test swab and an improved bacteriuria test paper and the like.

How these and other objects of this invention are accomplished will become apparent in the light of the accompanying disclosure made with reference to the accompanying drawing wherein there are illustrated various embodiments of the practices of this invention, specifically, Wherein FIG. 1 illustrates a test paper impregnated with the combination of test ingredients in accordance with this invention;

Wherein FIG. 2 illustrates a protected test paper in accordance with the practices of this invention;

Wherein FIG. 3 is a cross-sectional view taken along line 3—3 of FIG. 2;

Wherein FIG. 4 illustrates a test swab impregnated with the combination of test ingredients in accordance with this invention; and Wherein FIG. 5 illustrates a protected test swab in accordance with this invention.

An improved bacteriuria test reagent in accordance with this invention comprises a sulfanilamide and N-(1-Naphthyl)ethylenediamine dihydrochloride. In accordance with one embodiment a bacteriuria test paper or bacteriuria cotton swab and the like is provided by forming a solution containing a sulfanilamide, such as the compound sulfanilamide, and N-(1-Naphthyl)ethylenediamine dihydrochloride and impregnating a suitable substrate, such as paper or a cotton swab, with the solution and then permitting the resulting impregnated substrate, such as the paper or swab, to dry. When the resulting test paper or swab or even the solution itself is brought into contact with a test specimen to determine the presence of bacteriuria, a color change of the test paper or swab to a reddish color occurs, if the test is positive, i.e., if there is bacteriuria, since bacteriuria leads to the formation of nitrites which upon contact with the aforesaid test materials brings about the above-mentioned color change.

Various solvents may be employed in the preparation of the impregnated test paper or test swabs in accordance with this invention. For example, a concentrated or saturated or substantially saturated acetone solution of sulfanilamide is formed. Other suitable solvents might be employed in place of or in admixture with acetone. There is also formed a concentrated or saturated or substantially saturated N-(1-Naphthyl)ethylenediamine dihydrochloride in alcohol or other suitable solvent. These solutions could then be combined and the resulting solution comprising an admixture of sulfanilamide and N-(1-Naphthyl)ethylenediamine dihydrochloride could then be employed to impregnate the test substrate materials, such as the test paper, cotton swab or the like.

If desired, a single solvent, a ketone, such as acetone, an alcohol, such as ethanol, an ether, such as ethyl ether, or a mixture of solvents, e.g., the aforementioned solvents, might be employed as the common solvent for the combination of the active test materials in accordance with this invention. For example, an acetone and/or ethanol solution of sulfanilamide and N-(1-Naphthyl)ethylenediamine dihydrochloride could be prepared and the resulting solution employed to impregnate the test paper or cotton swab or other suitable substrate or bacteriuria test carrier. Solutions containing from about 2% by weight or less up to about 10 percent by weight or more of the aforementioned test components, separately or together are usefully employed in the practice of this invention for the preparation of the bacteriuria test reagent materials, particularly impregnated bacteriuria test papers and the impregnated bacteriuria cotton test swabs.

Desirably, in the preparation of the bacteriuria test reagents in accordance with this invention, the sulfanilamide component, e.g., sulfanilamide and the other component N-(1-Naphthyl)ethylenediamine dihydrochloride, are present in a stoichiometric amount relative to each other. For example, if desired, these materials are present in admixture in the bacteriuria test reagent on an equimolar basis. If desired, however, on a molar basis one component may be present in a greater amount than the other component. Further, by way of example, the sulfanilamide component may be present relative to the N-(1-Naphthyl)ethylenediamine dihydrochloride component in a weight or molar ratio in the range 1:10 or from 10:1, respectively. A broad range of the proportions of the test components making up the bacteriuria reagent materials in accordance with this invention is possible due to the intense and noticeable color change brought about by the presence of these materials in contact with an aqueous nitrite-containing solution. The intensity of the change in color to a red color is indicative not only of the presence of bacteriuria but may also be indicative of the extent of the bacteria infection.

In the practice of this invention it is preferred that the components of the bacteriuria test reagent be incorporated or impregnated on a paper strip or cotton swab. Desirably, the cotton swab is disposed or wrapped or fixed to the end of a suitable stick or carrier, e.g., in the nature of Q-Tips cotton swabs manufactured by Cheseborough-Ponds, Inc. New York, N. Y.

As indicated hereinabove, the impregnated bacteriuria test paper or swab is immersed in the test specimen to determine by an observable color change in the test paper or swab from a white or natural color, depending upon the nature of the substrate material, to a reddish color indicative of the presence of nitrite and therefore a bacteria infection or bacteriuria if the test specimen is a urine sample. If desired, however, the test reagents in accordance with this invention may be employed in solution form. In this embodiment a solution of the test reagents is admixed with the test specimen and the color change observed. The advantages of this invention, however, are obtainable when the bacteriuria test materials of this invention are incorporated or impregnated in dry form in a suitable carrier, such as a paper or cotton swab.

In accordance with yet another embodiment of the practices of this invention, instead of forming a solution containing the test reagents in accordance with this invention, a finely divided dry admixture of the test reagents may be formed and then coated onto or otherwise affixed to the paper or cotton swab carrier. Instead of forming a dry, finely divided admixture of these materials, the materials in finely divided form may be separately applied to the carrier.

Various embodiments of the practices of this invention are illustrated in the accompanying drawing. Specifically, FIG. 1 illustrates a strip 10 of test paper impregnated with a combination of test reagents, e.g., sulfanilamide and N-(1-Naphthyl)ethylenediamine dihydrochloride in accordance with this invention. FIGS. 2 and 3 illustrate a strip of test paper, of the type illustrated in FIG. 1, wherein the test paper is sandwiched between or protected on both sides by a removable or strippable film or layer or coating 11 of substantially moisture-impermeable plastic material, such as a thin film of polyethylene or Mylar or polyvinyl chloride or the like. Film 11 of plastic material serves to protect the underlying or sandwiched test paper from exposure to moisture and the surrounding atmosphere and to protect test paper 10 during storage and/or handling.

FIG. 4 illustrates a test swab in accordance with this invention wherein wad 12 of cotton impregnated with the test reagent in accordance with this invention is gathered around and fixed to one end of a suitable carrier or stick 14. FIG. 5 is illustrative of a special embodiment of a test swab in accordance with this invention as illustrated in FIG. 2. In the embodiment illustrated in FIG. 5 cotton wad 12 is protected in the manner similar to test paper 10 as illustrated in FIGS. 2 and 3 by enclosing wad 12 within a removable, substantially moisture-impermeable plastic coating, film or envelope 15 which is suitably affixed to holder or stick 14 as illustrated, e.g., by twistedly affixing film 15 to holder 14.

The following example is illustrative of the practices of this invention. A substantially saturated acetone solution of sulfanilamide is formed. There is also formed a solution of N-(1-Naphthyl)ethylenediamine dihydrochloride in ethanol. These solutions are then combined. A suitable substrate material, such as paper or a cotton swab, is then wetted with or introduced into the combined solutions and dried. When employed in a bacteriuria test procedure the impregnated paper or swab is brought into contact with or immersed in the test specimen. In a positive test, i.e., an indication of nitrite due to the presence of bacteria, the test paper or swab will change from a white to dark red, light red, pink or purple color. Any of these color changes indicates a positive reaction and the presence of bacteriuria. Upon the observation of a positive test or reaction the test specimen is then sent to a diagnostic laboratory for bacteria colony count and for identification of the bacteria. From these laboratory tests a diagnosis can be rendered and appropriate therapy initiated.

Other embodiments of the practices of this invention include a compressed admixture of the reagent materials, such as a sulfanilamide, e.g., sulfanilamide, and N-(1-Naphthyl)ethylenediamine dihydrochloride, the compressed admixture preferably being in the form of a tablet or disc. The compressed admixture would desirably include an inert carrier or diluent, preferably white in color and water-insoluble, which would also usefully function as a binder for the aforesaid reagent materials. Suitable such carrier materials or diluents would include the normally water-insoluble inert salts, such as in tablet or disc form, would then have added thereto a drop of the urine specimen to be tested.

In accordance with another embodiment of this invention involving a paper impregnated with the special reagent admixture, paper, preferably cut into a desired shape, such as a strip or circle, is coated or impregnated with the reagent admixture. In use, the paper is contacted with the drop of urine specimen to be tested.

As will be apparent to those skilled in the art in the light of the foregoing disclosure, many modifications, alterations and substitutions are possible in the practice of this invention without departing from the spirit or scope thereof.

I claim:

1. A composition useful as a bacteriuria test material consisting essentially of an admixture of a sulfanilamide and N-(1-Naphthyl)ethylenediamine dihydrochloride.

2. A composition in accordance with claim 1 wherein said admixture is compressed into tablet or disc or wafer form.

3. A composition in accordance with claim 1 wherein said admixture contains a major amount of a white-colored, water-insoluble, inert, finely divided carrier or diluent, the resulting admixture being compressed into tablet form.

4. A composition in accordance with claim 1 wherein said sulfanilamide is sulfanilamide.

5. A test material in accordance with claim 1 wherein said admixture is disposed in an anhydrous carrier.

6. A test material in accordance with claim 5 wherein said carrier is an alcohol.

7. A test material in accordance with claim 5 wherein said carrier is a ketone.

8. A test material in accordance with claim 5 wherein said carrier is a solid carrier.

9. A test material in accordance with claim 5 wherein said carrier is a paper.

10. A test material in accordance with claim 9 wherein said paper is protected by a strippable substantially moisture-impermeable film or coating.

11. A test material in accordance with claim 5 wherein said carrier is a cotton swab.

12. A test material in accordance with claim 11 wherein said cotton swab is affixed to a wooden or plastic holder.

13. A test material in accordance with claim 12 wherein said cotton swab is enclosed within a removable substantially moisture-impermeable envelope or coating.

14. A test material in accordance with claim 5 wherein said carrier is a solid, porous or permeable water-insoluble carrier.

15. In a bacteriuria test wherein the specimen to be tested is brought into contact with a reagent material which undergoes a change in color, the improvement which comprises employing as said reagent a material which consists essentially of a sulfanilamide and N-(1-Naphthyl)ethylenediamine dihydrochloride.

16. A method in accordance with claim 15 wherein said reagent consists essentially of sulfanilamide and N-(1-Naphthyl)ethylenediamine dihydrochloride disposed on a porous, water-insoluble carrier.

17. A method in accordance with claim 16 wherein said carrier is paper.

18. A method in accordance with claim 16 wherein said carrier is cotton swab.

19. A method in accordance with claim 18 wherein said sulfanilamide and said N-(1-Naphthyl)ethylenediamine dihydrochloride are present in the relative proportions in parts by weight or mols in the range 1:10 to 10:1, respectively.

20. A bacteriuria test paper consisting essentially of paper impregnated with a sulfanilamide and N-(1-Naphthyl) ethylenediamine dihydrochloride wherein said sulfanilamide and said N-(1-Naphthyl)ethylenediamine dihydrochloride are present in the relative proportions in parts by weight or mols in the range 1:10 to 10:1, respectively.

* * * * *